United States Patent
Kuboki et al.

(10) Patent No.: US 6,342,319 B1
(45) Date of Patent: Jan. 29, 2002

(54) NONAQUEOUS ELECTROLYTE SECONDARY BATTERY AND METHOD OF MANUFACTURING NEGATIVE ELECTRODE

(75) Inventors: Takashi Kuboki, Tokyo; Norio Takami; Takahisa Ohsaki, both of Yokohama, all of (JP)

(73) Assignee: Kabushiki Kaisha Toshiba, Kawasaki (JP)

(*) Notice: Subject to any disclaimer, the term of this patent is extended or adjusted under 35 U.S.C. 154(b) by 0 days.

(21) Appl. No.: 09/038,975

(22) Filed: Mar. 12, 1998

(30) Foreign Application Priority Data

Mar. 13, 1997 (JP) ................................ 9-076698

(51) Int. Cl.[7] .......................... H01M 4/96; H01M 4/60; H01M 4/36
(52) U.S. Cl. .................................. 429/231.8; 429/231.4
(58) Field of Search .......................... 429/231.8, 231.4

(56) References Cited

U.S. PATENT DOCUMENTS

| | | | |
|---|---|---|---|
| 4,615,960 A | | 10/1986 | Yata |
| 4,863,814 A | * | 9/1989 | Mohri et al. ................... 429/60 |
| 5,244,757 A | * | 9/1993 | Takami et al. ............... 429/194 |
| 5,426,006 A | * | 6/1995 | Delnick et al. |
| 5,482,797 A | * | 1/1996 | Yamada et al. |
| 5,498,492 A | * | 3/1996 | Hara et al. ................... 429/212 |
| 5,510,212 A | * | 4/1996 | Delnick et al. |
| 5,589,299 A | * | 12/1996 | Yamada et al. |
| 5,612,155 A | * | 3/1997 | Takami et al. |
| 5,874,166 A | * | 2/1999 | Chu et al. ................... 428/368 |

FOREIGN PATENT DOCUMENTS

JP 9-293504 11/1997

OTHER PUBLICATIONS

S. Yata, et al., "Structure and properties of deeply Li-doped polyacenic semiconductor materials beyond $C_6Li$ stage", Synthetic Metals, 62, 1994, pp. 153–158, no month.

A. Mabuchi, et al., "Charge-Discharge Characteristics of the Mesocarbon Miocrobeads Heat-Treated at Different Temperatures", J. Electrochem Soc., vol. 142, No. 4, Apr. 1995, pp. 1041–1046.

\* cited by examiner

*Primary Examiner*—Gabrielle Brouillette
*Assistant Examiner*—Tracy Dove
(74) *Attorney, Agent, or Firm*—Oblon, Spivak, McClelland, Maier & Neustadt, P.C.

(57) ABSTRACT

This invention provides a nonaqueous electrolyte secondary battery including a negative electrode containing a carbonaceous material aggregate having a structure in which carbonaceous material plates are three-dimensionally distributed, the carbonaceous material plates being capable of absorbing and desorbing lithium ions and having a molar ratio of hydrogen to carbon of 0.2 to 0.4.

27 Claims, 3 Drawing Sheets

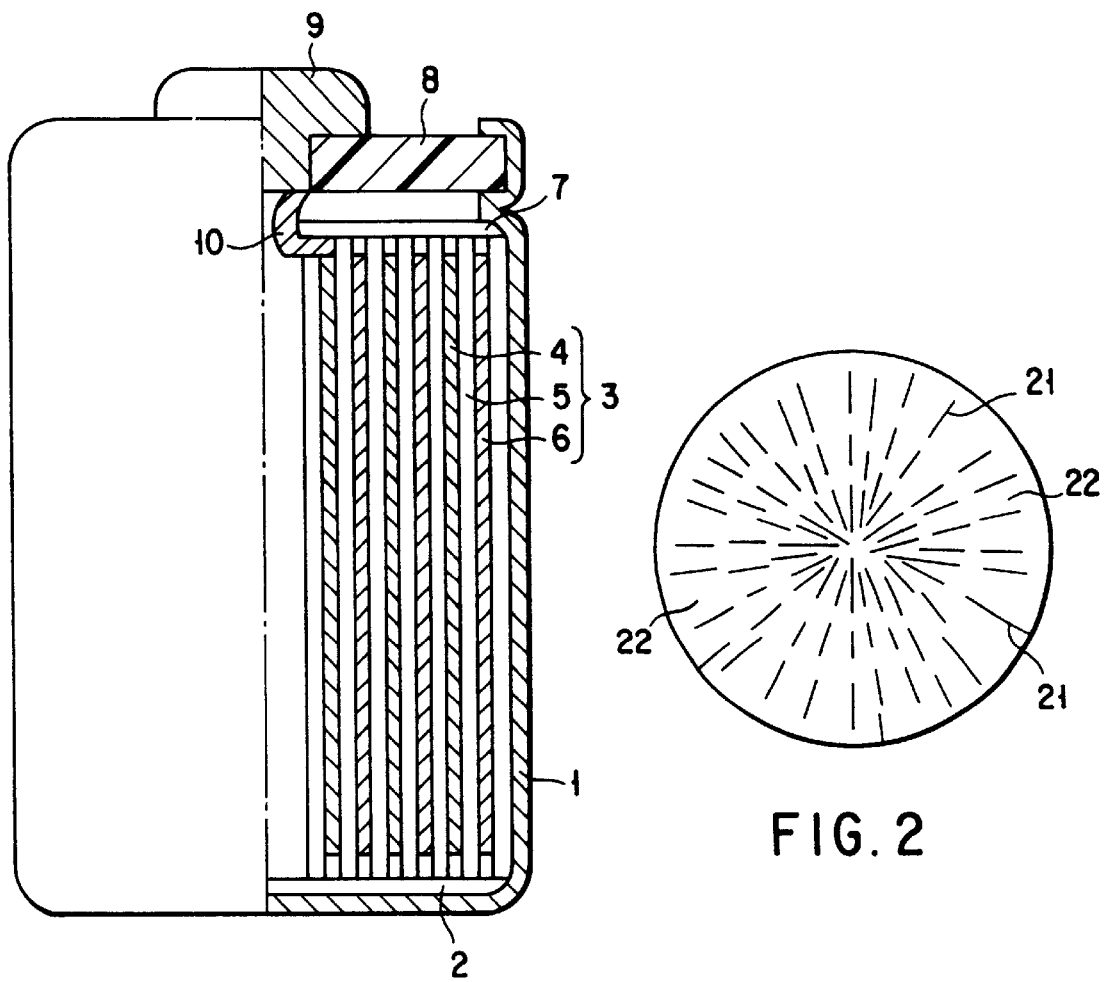
FIG. 1
FIG. 2
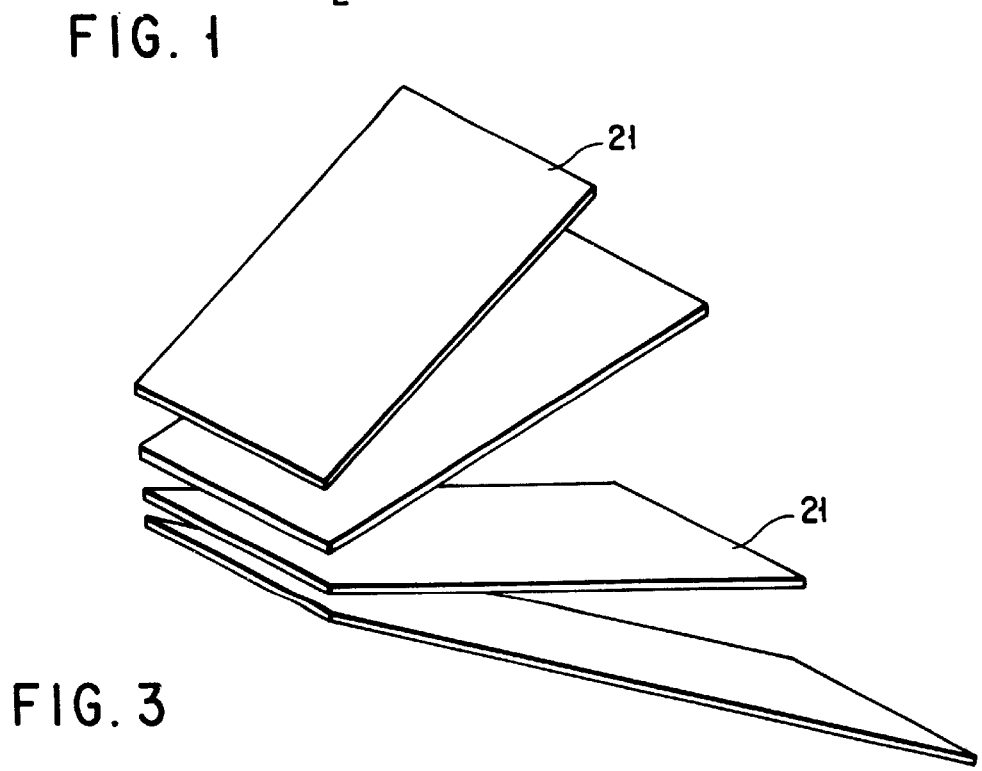
FIG. 3

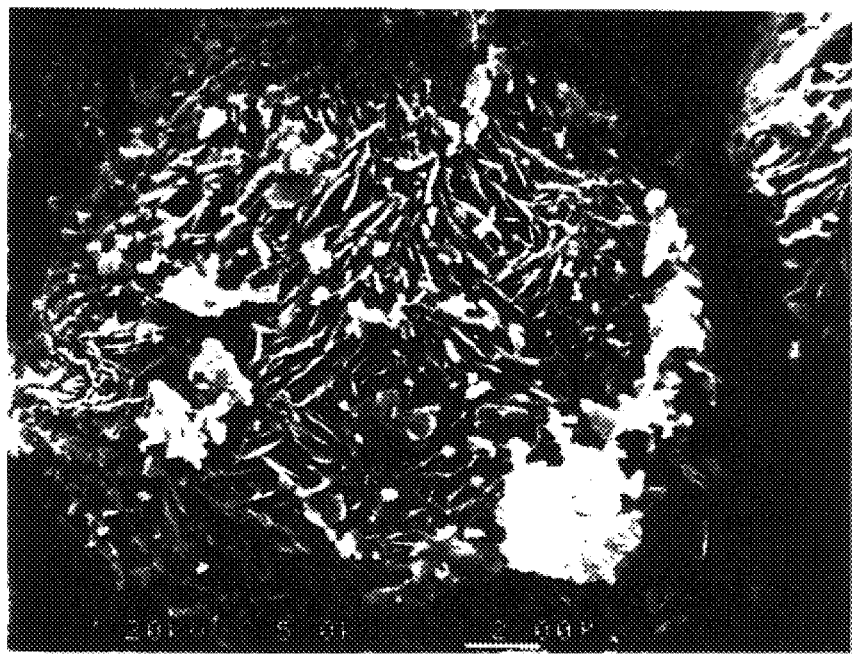
FIG. 11  2.00μm
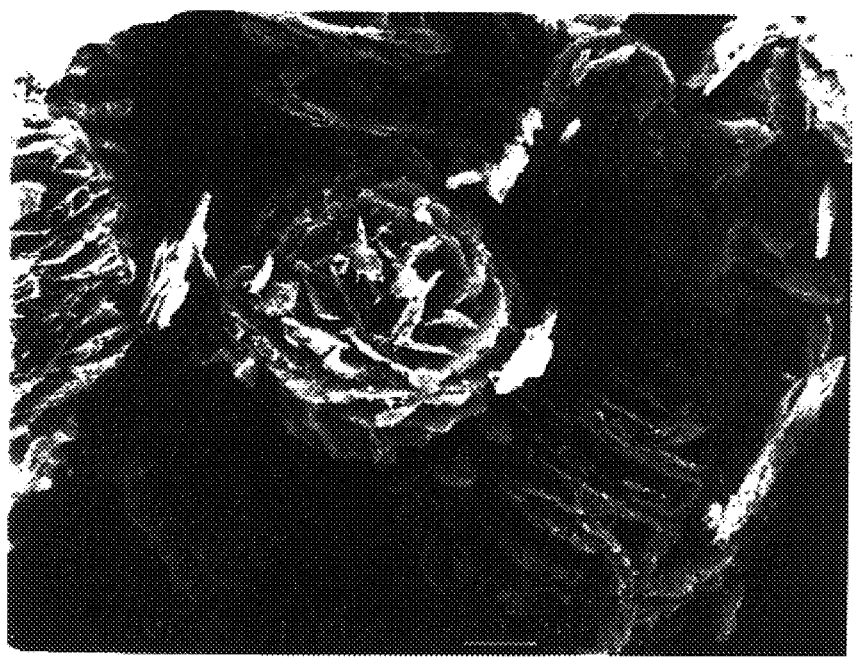
FIG. 12  10.00μm

US 6,342,319 B1

NONAQUEOUS ELECTROLYTE SECONDARY BATTERY AND METHOD OF MANUFACTURING NEGATIVE ELECTRODE

BACKGROUND OF THE INVENTION

The present invention relates to a nonaqueous electrolyte secondary battery having an improved negative electrode and a method of manufacturing a negative electrode.

Nonaqueous electrolyte secondary batteries represented by a lithium-ion secondary battery have a high energy density and are extensively used in portable apparatuses such as portable telephones, portable information terminals, and personal computers. To further decrease the sizes and weights of these apparatuses, batteries as their power supplies are required to have a higher energy density, and researches are being made to increase the capacity of the electrode material.

Of these researches, the use of carbonaceous materials such as activated carbon and graphite as a negative electrode material is examined in, e.g., Jpn. Pat. Appln. KOKAI Publication Nos. 58-35811 and 59-143280.

Unfortunately, secondary batteries including negative electrodes containing known carbonaceous materials have a small discharge capacity. Therefore, it is being demanded to develop a negative electrode material capable of further increasing the capacity.

BRIEF SUMMARY OF THE INVENTION

It is an object of the present invention to provide a large-capacity nonaqueous electrolyte secondary battery.

It is another object of the present invention to provide a method of manufacturing a high-performance negative electrode.

The present invention provides a nonaqueous electrolyte secondary battery comprising a negative electrode containing a carbonaceous material aggregate having a structure in which carbonaceous material plates are three-dimensionally distributed, the carbonaceous material plates being capable of absorbing and desorbing lithium ions and having a molar ratio of hydrogen to carbon of 0.2 to 0.4.

The present invention also provides a method of manufacturing a negative electrode containing a carbonaceous material which is capable of absorbing and desorbing lithium ions, wherein the carbonaceous material is formed by a method comprising the step of heat-treating a carbonaceous material precursor containing at least one substance selected from the group consisting of a metal salt of an aromatic compound and a metal complex of an aromatic compound at 500 to 1500° C. in an inert gas ambient.

Additional object and advantages of the invention will be set forth in the description which follows, and in part will be obvious from the description, or may be learned by practice of the invention. The object and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a partial sectional view showing an embodiment of a nonaqueous electrolyte secondary battery (e.g., a cylindrical nonaqueous electrolyte secondary battery) according to the present invention;

FIG. 2 is a schematic view showing a circular section of a carbonaceous material aggregate contained in a negative electrode of the nonaqueous electrolyte secondary battery according to the present invention;

FIG. 3 is a perspective view schematically showing a central portion of the carbonaceous material aggregate;

FIG. 11 is a scanning electron micrograph (SEM photograph) showing a carbonaceous material aggregate contained in a negative electrode of a nonaqueous electrolyte secondary battery of Example 1 according to the present invention; and FIG. 12 is a scanning electron micrograph (SEM photograph) showing the carbonaceous material aggregate contained in the negative electrode of the nonaqueous electrolyte secondary battery of Example 13 according to the present invention.

DETAILED DESCRIPTION OF THE INVENTION

Figure 4:
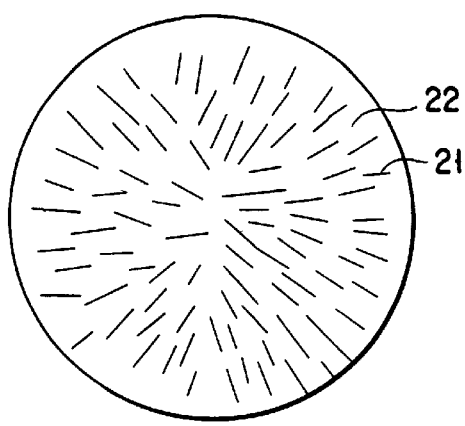
FIG. 4 is a schematic view showing a circular section of another carbonaceous material aggregate contained in the negative electrode of the nonaqueous electrolyte secondary battery according to the present invention.

A nonaqueous electrolyte secondary battery (e.g., a cylindrical nonaqueous electrolyte secondary battery) according to the present invention will be described below with reference to FIG. 1.

An insulator 2 is arranged on the bottom of a closed-end, cylindrical case 1 made from, e.g., stainless steel. An electrode group 3 is accommodated in the case 1. This electrode group 3 has a structure in which a band-like material formed by stacking a positive electrode 4, a separator 5, and a negative electrode 6 in this order is spirally wound.

An electrolyte is contained in the case 1. An insulating sheet 7 having an opening in its center is placed above the electrode group 3 in the case 1. An insulating sealing plate

8 is arranged in the upper opening of the case 1 and liquid-tightly fixed to the case 1 by caulking a portion near the upper opening inward. A positive terminal 9 is fitted in the center of the insulating sealing plate 8. One end of a positive lead 10 is connected to the positive electrode 4, and the other end is connected to the positive terminal 9. The negative electrode 6 is connected to the case 1 as a negative terminal via a negative lead (not shown).

The positive electrode 4, the separator 5, the negative electrode 6, and the electrolyte will be described in detail below.

1) Positive Electrode 4

The positive electrode 4 is manufactured by suspending a positive electrode active material, a conducting agent, and a binder in an appropriate solvent, coating a collector with the resultant suspension, and drying the resultant structure to form a thin plate.

Examples of the active material are vanadium pentoxide ($V_2O_5$), manganese dioxide ($MnO_2$), a lithium-manganese composite oxide such as $LiMn_2O_4$ and $LiMnO_2$, a lithium-containing nickel oxide such as $LiNiO_2$, a lithium-containing cobalt oxide such as $LiCoO_2$, a lithium-containing nickel-cobalt oxide, a lithium-containing iron oxide, a lithium-containing vanadium oxide, a chalcogen compound (e.g., titanium disulfide and molybdenum disulfide), and a conductive organic polymer (e.g., polyanine, polypyrrole, polythiophene, and polydisulfide). Of these materials, the use of a lithium-containing cobalt oxide, a lithium-containing nickel oxide, and a lithium-manganese composite oxide is preferable because a high voltage can be obtained.

Examples of the conducting agent are acetylene black, carbon black, and graphite.

As the binder, it is possible to use, e.g., polytetrafluoroethylene (PTFE), polyvinylidene fluoride (PVdF), an ethylene-propylene-diene copolymer (EPDM), or styrene-butadiene rubber (SBR).

The mixing ratios of the positive electrode active material, the conducting agent, and the binder are preferably 80 to 95 wt %, 3 to 20 wt %, and 2 to 7 wt %, respectively.

As the collector, an aluminum foil, a stainless steel foil, a nickel foil, or the like can be used.

2) Separator 5 As the separator 5, it is possible to use, e.g., synthetic resin nonwoven fabric, a polyethylene porous film, or a polypropylene porous film.

3) Negative Electrode 6

The negative electrode 6 contains a carbonaceous material aggregate having a structure in which carbonaceous material plates capable of absorbing and desorbing lithium ions are three-dimensionally distributed. The molar ratio (H/C) of hydrogen atoms to carbon atoms in the carbonaceous material plates is 0.2 to 0.4.

The shape of the aggregate can be, e.g., a sphere, a nearly spherical shape, a body of revolution obtained by revolving an ellipse about its major axis, a shape obtained by dividing a sphere, a nearly spherical shape, or the body of revolution into an arbitrary number, a sectoral pillar, or a column. Examples of the divided shape are a hemisphere, a comb-like shape obtained by dividing a sphere into four equal parts, and a shape obtained by dividing a sphere into eight equal parts.

As the aggregate described above, it is preferable to use any of a carbonaceous material aggregate a having a section in which at least some of carbonaceous material plates extend radially, a carbonaceous material aggregate b having a sectoral section in which at least some of carbonaceous material plates radially extend from the center of the arc, and a carbonaceous material aggregate c having a section in which at least some of carbonaceous material plates are parallel to each other. The negative electrode preferably contains at least one of the aggregates a to c.

As described above, the carbonaceous material aggregate a has a section having a radial arrangement. The radial arrangement here means that the carbonaceous material plate extends radially or substantially in a radial direction outward. The term "substantially" noted above denotes that the imaginary lines extending inward from the inner ends of these plates cross each other at a point deviant from the center of the section. The section of the carbonaceous material aggregate a is preferably a circle. This circular section herein mentioned includes an elliptic section. At least one section of the aggregate a need only be the specific section described above. FIGS. 2 to 4 show examples of the aggregate a. The first example will be explained. This carbonaceous material aggregate is a sphere or a hemisphere. The aggregate has a circular section in which almost all the rectangular carbonaceous material plates 21 are radially arranged toward 4 the outer periphery 9 of the circle. The surfaces in the direction of thickness of the carbonaceous material plates 21 are exposed on the section. Gaps 22 often exist between the surfaces corresponding to the areas of the carbonaceous material plates 21. As shown in FIG. 3, the carbonaceous material plates 21 are so stacked as to draw an arc in the center of the aggregate. The second example will be explained below. This carbonaceous material aggregate is a sphere or a hemisphere. As shown in FIG. 4, the aggregate has a circular section in which some of the carbonaceous material plates 21 extend substantially in a radial direction toward the outer periphery of the circle. The surfaces in the direction of thickness of the carbonaceous material plates 21 are exposed on the section. Gaps 22 often exist between the surfaces corresponding to the areas of the carbonaceous material plates 21.

Figure 5:
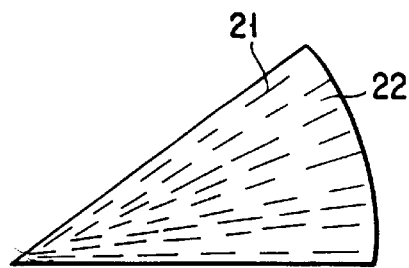
FIG. 5 is a schematic view showing a sectoral section of the carbonaceous material aggregate contained in the negative electrode of the nonaqueous electrolyte secondary battery according to the present invention.
Figure 7:
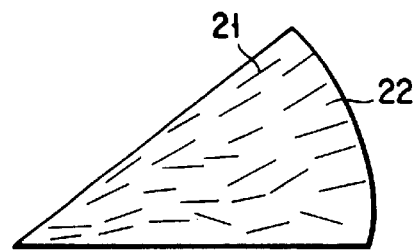
FIG. 7 is a schematic view showing a sectoral section of still another carbonaceous material aggregate contained in the negative electrode of the nonaqueous electrolyte secondary battery according to the present invention.
Figure 6:
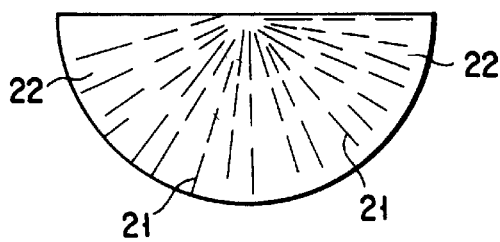
FIG. 6 is a schematic view showing a sectoral section of another carbonaceous material aggregate contained in the negative electrode of the nonaqueous electrolyte secondary battery according to the present invention.

The carbonaceous material aggregate b has a sectoral section in which at least some of the carbonaceous material plates are radially arranged from the center of the arc. The center of the arrangement may be slightly deviated from the center of the arc. This sectoral section herein mentioned means a sectoral section whose central angle is larger than 0° and smaller than 360°. Also, at least one section of the aggregate b need only be the specific sectoral section as described above. FIGS. 5 and 6 show examples of this aggregate b. As shown in FIG. 5, a carbonaceous material aggregate as the first example has a shape obtained by dividing a sphere into eight equal parts and has a sectoral section in which all the carbonaceous material plates are radially arranged from the center of the arc. The surfaces in the direction of thickness of the carbonaceous material plates 21 are exposed on the sectoral section. The gaps 22 often exist between the surfaces corresponding to the areas of the carbonaceous material plates 21. Also, as shown in FIG. 6, a carbonaceous material aggregate as the second example has a comb-like shape obtained by dividing a sphere into four equal parts and has a semicircular section in which all the carbonaceous material plates 21 are radially arranged from the center of the arc. The surfaces in the direction of thickness of the carbonaceous material plates 21 are exposed on the sectoral section. The gaps 22 often exist between the surfaces corresponding to the areas of the carbonaceous material plates 21. Note that other sectoral sections connecting to this section have no such shape. In FIGS. 5 and 6, the aggregates in which all the carbonaceous material plates are arranged in the radial direction of the sectoral sections. However, some carbonaceous material plates may not be radially arranged, as shown in FIG. 7.

Figure 8:
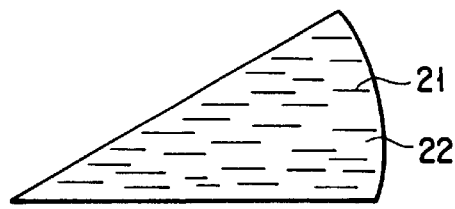
FIG. 8 is a schematic view showing a section of still another carbonaceous material aggregate contained in the negative electrode of the nonaqueous electrolyte secondary battery according to the present invention.
Figure 9:
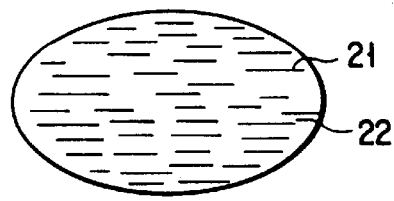
FIG. 9 is a schematic view showing a section of still another carbonaceous material aggregate contained in the negative electrode of the nonaqueous electrolyte secondary battery according to the present invention.
Figure 10:
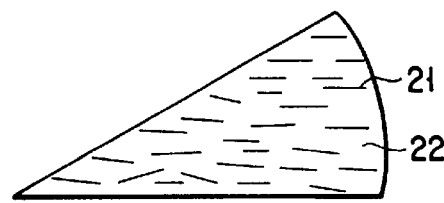
FIG. 10 is a schematic view showing a sectoral section of still another carbonaceous material aggregate contained in the negative electrode of the nonaqueous electrolyte secondary battery according to the present invention.

The carbonaceous material aggregate c has a section in which at least some of carbonaceous material plates are parallel to each other. At least one section of the aggregate c need only be the specific section as described above. FIGS. 8 and 9 show examples of the carbonaceous material aggregate c. As shown in FIG. 8, a carbonaceous material aggregate as the first example has a sectoral pillar-like shape and has a sectoral section in which the carbonaceous material plates 21 are parallel to each other. The surfaces in the direction of the thickness of the carbonaceous material plates 21 are exposed on the section. Gaps 22 often exist between the surfaces corresponding to the areas of the carbonaceous material plates 21. Also, as shown in FIG. 9, a carbonaceous material aggregate as the second example has the shape of a body of revolution obtained by revolving an ellipse about its major axis and has an elliptic section in which the carbonaceous material plates 21 are parallel to each other. The surfaces in the direction of the thickness of the carbonaceous material plates 21 are exposed on the section. Gaps 22 often exist between the surfaces corresponding to the areas of the carbonaceous material plates 21. In this aggregate c, as shown in FIG. 10, some of the carbonaceous material plates 21 need not be arranged parallel in the section.

The molar ratio of hydrogen atoms to carbon atoms in the carbonaceous material plates is limited to the aforementioned range for the reasons explained below. If the molar ratio is smaller than 0.2, a fine structure of the carbonaceous material plates takes a graphite structure or a glassy carbon structure in which no interlayer portions for absorbing and desorbing lithium ions exist. Consequently, the lithium ion absorbing·desorbing amount of the carbonaceous material plates reduces, and this decreases the discharge capacity. On the other hand, if the molar ratio is larger than 0.4, carbonization of the carbonaceous material plates does not well proceed. This decreases the conductivity of the carbonaceous material and largely reduces the lithium ion absorbing·desorbing amount. Additionally, the carbonaceous material is readily eluted in the nonaqueous electrolyte. As a consequence, the discharge capacity decreases if the molar ratio is larger than 0.4. To particularly further increase the discharge capacity, the molar ratio is preferably 0.25 to 0.35.

The content of carbon atoms in the carbonaceous material plates is preferably 88 wt % or more. If the content is less than 88 wt %, a carbonization reaction of the carbonaceous material plates does not well progress in some instances. Also, to avoid the fine structure of the carbonaceous material plates from taking a graphite structure or a glassy carbon structure in which no interlayer portions for absorbing and desorbing lithium ions exist, the upper-limit value of the content is preferably set to 97 wt %. To particularly further increase the discharge capacity, the content is preferably 89 to 95 wt %.

The average pore size of the above carbonaceous material aggregate measured by a BET method is preferably 40 Å (4 nm) to 85 Å (8.5 nm) for the reasons explained below. If this average pore size is smaller than 40 Å, the electrolyte permeability of the aggregate decreases, and the charge/discharge characteristics may deteriorate. If the average pore size is larger than 85 Å, the bulk density of the aggregate decreases, and the energy density per volume of the negative electrode may decrease. To particularly further increase the discharge capacity, the average pore size is preferably 55 to 65 Å.

Examples of the shape of the carbonaceous material plates are a scale, a rectangular plate, and an ellisptic plate. The length of the carbonaceous material plates is preferably 0.1 to 20 $\mu$m for the reasons explained below. If the length of the carbonaceous material plates is smaller than 0.1 $\mu$m, the surface area of the aggregate excessively increases. Accordingly, the amount of film formed on the surfaces of the carbonaceous,material plates by the decomposition of the nonaqueous electrolyte during initial charging may increase. This may lead to a decrease in the initial charge efficiency or the discharge capacity. On the other hand, if the length of the carbonaceous material plates is larger than 20 $\mu$m, the diffusion rate of lithium ions inside the negative electrode decreases, and this may deteriorate the charge/discharge characteristics. The length of the carbonaceous material plates is more preferably 0.1 to 12 $\mu$m, most preferably 0.5 to 10 $\mu$m.

The thickness of the carbonaceous material plates is preferably 0.01 to 2 $\mu$m (10 to 2000 nm) for the reasons explained below. If the thickness of the carbonaceous material plates is smaller than 0.01 $\mu$m, the surface area of the carbonaceous material aggregate excessively increases. Accordingly, the amount of film formed on the surfaces of the carbonaceous material plates of the aggregate by the decomposition of the nonaqueous electrolyte during initial charging may increase. This may lead to a decrease in the initial charge efficiency. On the other hand, if the thickness of the carbonaceous material plates is larger than 2 $\mu$m, the diffusion rate of lithium ions inside the negative electrode decreases, and the charge/discharge characteristics may deteriorate. The thickness of the carbonaceous material plates is more preferably 0.01 to 0.2 $\mu$m (10 to 200 nm).

The carbonaceous material aggregate can be manufactured by, e.g., the following method. A carbonaceous material precursor containing one or both of a metal salt of an aromatic compound and a metal complex of an aromatic compound is heat-treated at 500 to 1500° C. in an inert gas ambient (e.g., argon gas). The resultant product generally contains a by-product such as a metal carbonate, a metal oxide, or a metal carbide. When lithium salt or lithium complex of an aromatic compound is used as the metal salt or the metal complex of an aromatic compound, at least one of lithium carbonate, lithium oxide, and lithium carbide often exists as a by-product in the resultant product. The carbonaceous material aggregates a and b described above can be manufactured by crushing the resultant product, removing the by-product by washing, and drying the resultant material. The carbonaceous material aggregate c can be manufactured by pressing the carbonaceous material aggregate a or b..

In the above manufacturing method, the crushing is performed after the heat treatment. However, the crushing can be performed at any point, e.g., before the heat treatment or after the washing.

The metal salt or the metal complex of an aromatic compound can be formed by reacting an aromatic compound having an acid dissociation constant pKa of 11 or less with a metal salt.

Examples of the fundamental skeleton of the aromatic compound are benzene, naphthalene, anthracene, phenanthrene, fluorene, azulene, indene, perylene, pyrrole, pyrazole, imidazole, triazole, pyridine, pyrazine, pyridazine, indole, quinoline, isoquinoline, quinoxaline, acridine, and phenanthroline. Also, a compound having a substituent group on an aromatic ring or a heterocyclic aromatic ring of any of these skeletons can also be used.

The acid dissociation constant pKa of the aromatic compound is limited to the aforementioned range because if the pKa is larger than 11, the aromatic compound may not form a salt or a complex with metal ions. The lower-limit value of the pKa is preferably 0.5. The pKa is more preferably 3.0 to 5.0.

An example of the aromatic compound having a pKa of 11 or less is a functional group containing at least one element selected from oxygen, nitrogen, and sulfur. Examples of this functional group are a carboxyl group, a hydroxyl group, an amino group, a carbonyl group, a thiol group, a sulfonyl group, a sulfinyl group, phenol, thiophenol, pyrrole, and a group obtained by introducing a substituent group into any of these groups. A carboxyl group is most preferable among other groups.

As the aromatic compound whose acid dissociation constant pKa falls within the above specific range, it is possible to use benzoic acid, benzene-1, 2-dicarboxylic acid, benzene-1, 3-dicarboxylic acid, benzene-1,4-dicarboxylic acid, benzene-1,2,4-tricarboxylic acid, benzene-1,2,4,5-tetracarboxylic acid, naphthalene-1-carboxylic acid, naphthalene-1,4-dicarboxylic acid, naphthalene-1,8-dicarboxylic acid, perylene-3,4,9,10-tetracarboxylic acid, phenol, hydroquinone, biphenol, bisphenol A, hydronaphthoquinone, and hydroanthoquinone. However, the aromatic compound is not particularly limited to these examples. The use of aromatic carboxylic acids is particularly preferable.

The molecular weight of the aromatic compound having an acid dissociation constant pKa of 11 or less is preferably 68 to 1000 for the reasons explained below. If the molecular weight is larger than 1000, the crystals of the aromatic compound become nonuniform to decrease the solubility in a solvent. The result is an irregular crystal structure of a metal salt or a metal complex obtained from the aromatic compound. As a consequence, it may become difficult to obtain a carbonaceous material aggregate having a structure in which carbonaceous material plates having an H/C of 0.2 to 0.4 are three-dimensionally distributed. On the other hand, if the molecular weight of the aromatic compound is smaller than 68, the aromatic compound may be released as a gas to the outside of the system during reaction. The molecular weight is more preferably 94 to 600.

Examples of the metal which forms a salt or a complex together with the aromatic compound are alkali metals such as lithium, sodium, potassium, rubidium, and cesium, alkali earth metals such as magnesium, calcium, strontium, and barium, scandium, titanium, vanadium, chromium, manganese, iron, cobalt, nickel, copper, zinc, aluminum, gallium, germanium, and tin. As this metal, it is possible to use one or two to five types of metals selected from the above metals. However, the metal is not particularly limited to these examples. Of these metals, at least one element selected from alkali metals and alkali earth metals is preferable, and lithium is most preferable.

The heat-treatment temperature is limited to the aforementioned range for the reasons explained below. If the heat-treatment temperature is lower than 500° C., the carbonaceous material plates may not be sufficiently carbonized. If the heat-treatment temperature is higher than 1500° C., the fine structure of the carbonaceous material plates may become a graphite structure or the glassy carbon structure described earlier. The heat-treatment temperature is more preferably 550 to 650° C.

The negative electrode 6 described previously can be manufactured by kneading a carbon material containing the carbonaceous material aggregate described above and a binder in the presence of a solvent, coating a collector with the resultant suspension, drying the resultant material, and pressing the dried material once or two to five times under a desired pressure.

The carbon material may also contain a carbonaceous material which absorbs and desorbs lithium ions and is different from the carbonaceous material aggregate.

As the binder of the negative electrode, it is possible to use, e.g., polytetrafluoroethylene (PTFE), polyvinylidene fluoride (PVdF), an ethylene-propylene-diene copolymer (EPDM), styrene-butadiene rubber (SBR), or carboxymethylcellulose (CMC). However, the binder is not particularly limited to these examples.

The mixing ratios of the carbon material and the binder are preferably 90 to 98 wt % of the carbon material and 2 to 10 wt % of the binder. In particular, the amount of the carbon material is preferably 5 to 20 mg/cm$^2$ when the negative electrode 6 is complete.

As the collector, a copper foil, a stainless steel foil, a nickel foil, or the like can be used.

4) Electrolyte

The nonaqueous electrolyte described earlier is prepared by dissolving an electrolytic salt in a nonaqueous solvent.

Examples of the nonaqueous solvent are cyclic or chain carbonates such as ethylenecarbonate, propylenecarbonate, diethyl carbonate, dimethylcarbonate, and methylethylcarbonate (MEC), cyclic or chain ethers such as 1,2-dimethoxyethane and 2-methyltetrahydrofuran, and cyclic or chain esters such as γ-butyrolactone, γ-valerolactone, δ-valerolactone, methyl acetate, ethyl acetate, propyl acetate, isopropyl acetate, methyl propionate, ethyl propionate, and propyl propionate. As the nonaqueous solvent, it is possible to use one solvent selected from these examples or a solvent mixture of two to five types of solvents selected from these examples. However, the nonaqueous solvent is not particularly limited to these examples.

Examples of the electrolytic salt contained in the nonaqueous electrolyte are lithium salts such as lithium perchlorate (LiClO$_4$), lithium phosphate hexafluoride (LiPF$_6$), lithium borofluoride (LiBF$_4$), arsenic lithium hexafluoride (LiAsF$_6$), lithium trifluoromethanesulfonate (LiCF$_3$SO$_3$), and bistrifluoromethylsulfonylimidolithium [LiN(CF$_3$)SO$_2$)$_2$]. As the electrolytic salt, one type or two or three types of lithium salts selected from these examples can be used. However, the electrolytic salt is not limited to these examples.

The dissolution amount of the electrolytic salt with respect to the nonaqueous solvent is preferably 0.5 to 2.0 mol/l.

As has been described in detail above, the nonaqueous electrolyte secondary battery according to the present invention includes a negative electrode containing a carbonaceous material aggregate which has a structure in which carbonaceous material plates are three-dimensionally distributed, and the carbonaceous material plates are capable of absorbing and desorbing lithium ions and have a molar ratio of hydrogen to carbon of 0.2 to 0.4. In this carbonaceous material aggregate, carbonization has appropriately proceeded. Also, since the surface area can be reduced compared to a conventional scale-like carbon powder, it is possible to suppress the decomposition of the nonaqueous electrolyte during initial charging and improve the initial charge efficiency. Accordingly, a secondary battery including a negative electrode containing this carbonaceous material aggregate has an extremely increased discharge capacity and an extended charge/discharge cycle lifetime.

The discharge capacity and the cycle lifetime of this secondary battery can be further increased by the use of at least one aggregate selected from (a) a carbonaceous material aggregate having a section in which at least some of the carbonaceous material plates extend radially, (b) a carbonaceous material aggregate having a sectoral section in which at least some of the carbonaceous material plates radially extend from the center of the arc, and (c) a carbonaceous material aggregate having a section in which at least some of the carbonaceous material plates are parallel to each other.

The discharge capacity and the cycle lifetime of the secondary battery can be further increased by specifically arranging the surfaces in the direction of thickness of the carbonaceous material plates as described previously in the aggregates a to c.

A method of manufacturing a negative electrode according to the present invention includes the step of heat-treating a carbonaceous material precursor containing at least one substance selected from a metal salt of an aromatic compound and a metal complex of an aromatic compound at 500 to 1500° C. in an inert gas ambient. By this method it is possible to form a carbonaceous material aggregate having a structure in which the carbonaceous material plates are three-dimensionally distributed, and the carbonaceous material plates having a molar ratio (H/C) which takes the specific value described above. After a negative electrode containing this carbonaceous material aggregate is manufactured, a nonaqueous electrolyte secondary battery is assembled by using this negative electrode. Consequently, it is possible to realize a nonaqueous electrolyte secondary battery whose discharge capacity and charge/discharge cycle lifetime are greatly increased.

Note that the present invention is applied to a cylindrical nonaqueous electrolyte secondary battery in FIG. 1 explained earlier. However, the present invention is similarly applicable to a rectangular nonaqueous electrolyte secondary battery. Also, the shape of the electrode group accommodated in the battery case is not limited to a spiral shape. That is, the electrode group can also be formed by stacking a plurality of positive electrodes, separators, and negative electrodes in the order named.

The present invention will be described in detail below by way of its example with reference to the accompanying drawings.

EXAMPLE 1

<Manufacture of Positive Electrode>

80 wt % of lithium-cobalt oxide, 15 wt % of acetylene black, and 5 wt % of polytetrafluoroethane were mixed in toluene to prepare a slurry. An aluminum foil (collector) was coated with the slurry, and the resultant material was pressed to form a positive electrode.

<Manufacture of Negative Electrode>

Tetralithium naphthalene-1,4,5,8-tetracarboxylate was heated at 550° C. for 12 h in an argon gas ambient. Note that naphthalene-1,4,5,8-tetracarboxylic acid as the material had an acid dissociation constant pKa of 3.5 to 4.5 and a molecular weight of 304. A qualitative analysis of the resultant product by powder X-ray diffraction revealed that lithium carbonate existed as a by-product in the product. The product was crushed and washed with hydrochloric acid and water to remove the lithium carbonate, and the resultant material was vacuum-dried by heating to manufacture a carbon material. The resultant carbon material was observed at 5000× with a scanning electron microscope (SEM), and a photomicrograph was taken. This photomicrograph is shown in FIG. 11. As can be seen from FIG. 11, the carbon material was a substantially spherical carbonaceous material aggregate in which scale-like carbonaceous material plates were three-dimensionally distributed like, e.g., a pinecone. Also, the surfaces corresponding to the areas of some of the carbonaceous material plates on the surface of the aggregate faced outward. Furthermore, a microscopic observation of the carbonaceous material aggregate showed that it had a circular section with the structure as shown in FIG. 4 described previously. That is, in this circular section some of the scale-like carbonaceous material plates extend substantially in a radial direction toward the outer periphery of the section. The surfaces in the direction of the thickness of the carbonaceous material plates are exposed on the section. Many gaps existed between the surfaces corresponding to the areas of the scale-like carbonaceous material plates. The average particle size of the carbonaceous material aggregate was measured by a laser diffraction type particle size analyzer (HELOS & RODOS (tradename) manufactured by SYMPATEC) and found to be 10 μm. The length and the thickness of the scale-like carbonaceous material plates were 0.1 to 10 μm and 10 to 100 nm, respectively. According to elemental analysis, the carbonaceous material plates contained 91 wt % of carbon atoms, and the molar ratio of hydrogen atoms to carbon atoms was 0.30. The average pore size of the carbonaceous material aggregate measured by the BET method was 53 Å.

97wt % of the above carbon material, 2 wt % of styrene-butadiene rubber, and 1 wt % of carboxymethylcellulose were mixed in water to prepare a slurry. A copper foil (collector) was coated with the slurry, and the resultant material was pressed to manufacture a negative electrode.

The positive electrode, a polyethylene porous film separator, and the negative electrode were stacked in this order and spirally wound to form an electrode group.

50 vol % of ethylenecarbonate and 50 vol % of methylethylcarbonate were mixed, and lithium phosphate hexafluoride was dissolved at a ratio of 1.0 mol/l in the resultant mixture, thereby preparing a nonaqueous electrolyte.

The above electrode group and electrolyte were accommodated in a stainless-steel closed-end, cylindrical case to obtain a cylindrical lithium secondary battery 18 mm in diameter and 65 mm in height having the structure as shown in FIG. 1 described earlier.

EXAMPLE 2

A lithium secondary battery having the same structure as in Example 1 except that a carbon material explained below was used as a negative electrode was assembled.

Tetralithium naphthalene-1,4,5,8-tetracarboxylate was heated at 800° C. for 12 h in an argon gas ambient. A qualitative analysis of the resultant product by powder X-ray diffraction indicated that lithium oxide and lithium carbonate existed as by-products in the product. The product was crushed and washed with hydrochloric acid and water to remove these by-products, and the resultant material was vacuum-dried by heating to manufacture a carbon material. When the resultant carbon material was observed with a scanning electron microscope (SEM), the carbon material was a substantially spherical carbonaceous material aggregate in which scale-like carbonaceous material plates were three-dimensionally distributed like, e.g., a pinecone or a Chinese cabbage. Again, the carbonaceous material aggregate had a circular section with the structure as shown in FIG. 4 described previously. The average particle size of the carbonaceous material aggregate was measured by the above-mentioned laser diffraction type particle size analyzer and found to be 11 μm. The length and the thickness of the scale-like carbonaceous material plates were 0.1 to 11 μm and 10 to 100 nm, respectively. According to elemental analysis, the carbonaceous material plates contained 95 wt % of carbon atoms, and the molar ratio of hydrogen atoms to carbon atoms was 0.25. The average pore size of the carbonaceous material aggregate measured by the BET method was 60 Å.

EXAMPLE 3

A lithium secondary battery having the same structure as in Example 1 except that a carbon material explained below was used as a negative electrode was assembled.

Tetralithium benzene-1,2,4,5-tetracarboxylate was heated at 800° C. for 12 h in an argon gas ambient. Note that benzene-1,2,4,5-tetracarboxylic acid as the material had an acid dissociation constant pKa of 3.5 to 4.5 and a molecular weight of 254. A qualitative analysis of the resultant product by powder X-ray diffraction showed that lithium carbide and lithium carbonate existed as by-products in the product. The product was crushed and washed with hydrochloric acid and water to remove these by-products, and the resultant material was vacuum-dried by heating to manufacture a carbon material. When the resultant carbon material was observed with a scanning electron microscope (SEM), the carbon material was a substantially spherical carbonaceous material aggregate in which scale-like carbonaceous material plates were three-dimensionally distributed like, e.g., a pinecone or a Chinese cabbage. Also, the carbonaceous material aggregate had a circular section with the structure as shown in FIG. 4 described previously. The average particle size of the carbonaceous material aggregate was measured by the above-mentioned laser diffraction type particle size analyzer and found to be 10 μm. The length and the thickness of the scale-like carbonaceous material plates were 0.1 to 10 μm and 10 to 100 nm, respectively. According to elemental analysis, the carbonaceous material plates contained 92 wt % of carbon atoms, and the molar ratio of hydrogen atoms to carbon atoms was 0.29. The average pore size of the carbonaceous material aggregate measured by the BET method was 52 Å.

EXAMPLE 4

A lithium secondary battery having the same structure as in Example 1 except that a carbon material explained below was used as a negative electrode was assembled.

Tetralithium benzene-1,2,4,5-tetracarboxylate was heated at 550° C. for 12 h in an argon gas ambient. A qualitative analysis of the resultant product by powder X-ray diffraction revealed that lithium carbonate existed as a by-product in the product. The product was crushed and washed with hydrochloric acid and water to remove this by-product, and the resultant material was vacuum-dried by heating to manufacture a carbon material. When the resultant carbon material was observed with a scanning electron microscope (SEM), the carbon material was a substantially spherical carbonaceous material aggregate in which scale-like carbonaceous material plates were three-dimensionally distributed like, e.g., a pinecone or a Chinese cabbage. Also, the carbonaceous material aggregate had a circular section with the structure as shown in FIG. 4 described previously. The average particle size of the carbonaceous material aggregate was measured by the above-mentioned laser diffraction type particle size analyzer and found to be 12 μm. The length and the thickness of the scale-like carbonaceous material plates were 0.1 to 12 μm and 10 to 100 nm, respectively. According to elemental analysis, the carbonaceous material plates contained 93 wt % of carbon atoms, and the molar ratio of hydrogen atoms to carbon atoms was 0.28. The average pore size of the carbonaceous material aggregate measured by the BET method was 55521 .

EXAMPLE 5

A lithium secondary battery having the same structure as in Example 1 except that a carbon material explained below was used as a negative electrode was assembled.

Tetralithium perylene-3,4,9,10-tetracarboxylate was heated at 550° C. for 12 h in an argon gas ambient. Note that perylene-3,4,9,10-tetracarboxylic acid as the material had an acid dissociation constant pKa of 3.5 to 4.5 and a molecular weight of 428. A qualitative analysis of the resultant product by powder X-ray diffraction indicated that lithium carbonate existed as a by-product in the product. The product was crushed and washed with hydrochloric acid and water to remove this by-product, and the resultant material was vacuum-dried by heating to manufacture a carbon material. When the resultant carbon material was observed with a scanning electron microscope (SEM), the carbon material was a substantially spherical carbonaceous material aggregate in which scale-like carbonaceous material plates were three-dimensionally distributed like, e.g., a pinecone or a Chinese cabbage. Moreover, the carbonaceous material aggregate had a circular section with the structure as shown in FIG. 4 described previously. The average particle size of the carbonaceous material aggregate was measured by the above-mentioned laser diffraction type particle size analyzer and found to be 10 μm. The length and the thickness of the scale-like carbonaceous material plates were 0.1 to 10 μm and 10 to 100 nm, respectively. According to elemental analysis, the carbonaceous material plates contained 92 wt % of carbon atoms, and the molar ratio of hydrogen atoms to carbon atoms was 0.32. The average pore size of the carbonaceous material aggregate measured by the BET method was 54 Å.

EXAMPLE 6

A lithium secondary battery having the same structure as in Example 1 except that a carbon material explained below was used as a negative electrode was assembled.

Dilithium benzene-1,4-dicarboxylate was heated at 550° C. for 12 h in an argon gas ambient. Note that benzene-1,4-dicarboxylic acid as the material had an acid dissociation constant pKa of 3.5 to 4.5 and a molecular weight of 166. A qualitative analysis of the resultant product by powder X-ray diffraction verified that lithium carbonate existed as a by-product in the product. The product was crushed and washed with hydrochloric acid and water to remove this by-product, and the resultant material was vacuum-dried by heating to manufacture a carbon material. An observation of the resultant carbon material with a scanning electron microscope (SEM) indicated that the carbon material was a substantially spherical carbonaceous material aggregate in which scale-like carbonaceous material plates were three-dimensionally distributed like, e.g., a pinecone or a Chinese cabbage. Again, the carbonaceous material aggregate had a circular section with the structure as shown in FIG. 4 described previously. The average particle size of the carbonaceous material aggregate was measured by the above-mentioned laser diffraction type particle size analyzer and found to be 12 μm. The length and the thickness of the scale-like carbonaceous material plates were 0.1 to 12 μm and 10 to 100 nm, respectively. According to elemental analysis, the carbonaceous material plates contained 92 wt % of carbon atoms, and the molar ratio of hydrogen atoms to carbon atoms was 0.32. The average pore size of the carbonaceous material aggregate measured by the BET method was 57 Å.

EXAMPLE 7

A lithium secondary battery having the same structure as in Example 1 except that a carbon material explained below was used as a negative electrode was assembled.

Dilithium benzene-1,3-dicarboxylate was heated at 550° C. for 12 h in an argon gas ambient. Note that benzene-1,3-dicarboxylic acid as the material had an acid dissociation constant pKa of 3.5 to 4.5 and a molecular weight of 166. A qualitative analysis of the resultant product by powder X-ray diffraction showed that lithium carbonate existed as a by-product in the product. The product was crushed and washed with hydrochloric acid and water to remove this by-product, and the resultant material was vacuum-dried by heating to manufacture a carbon material. When the resultant carbon material was observed with a scanning electron microscope (SEM), the carbon material was a substantially spherical carbonaceous material aggregate in which scale-like carbonaceous material plates were three-dimensionally distributed like, e.g., a pinecone or a Chinese cabbage. In addition, the carbonaceous material aggregate had a circular section with the structure as shown in FIG. 4 described previously. The average particle size of the carbonaceous material aggregate was measured by the above-mentioned laser diffraction type particle size analyzer and found to be 11 μm. The length and the thickness of the scale-like carbonaceous material plates were 0.1 to 11 μm and 10 to 100 nm, respectively. According to elemental analysis, the carbonaceous material plates contained 92 wt % of carbon atoms, and the molar ratio of hydrogen atoms to carbon atoms was 0.32. The average pore size of the carbonaceous material aggregate measured by the BET method was 62521.

EXAMPLE 8

A lithium secondary battery having the same structure as in Example 1 except that a carbon material explained below was used as a negative electrode was assembled.

Trilithium benzene-1,2,4-tricarboxylate was heated at 550° C. for 12 h in an argon gas ambient. Note that benzene-1,2,4-tricarboxylic acid as the material had an acid dissociation constant pKa of 3.5 to 4.5 and a molecular weight of 210. A qualitative analysis of the resultant product by powder X-ray diffraction showed that lithium carbonate existed as a by-product in the product. The product was crushed and washed with hydrochloric acid and water to remove this by-product, and the resultant material was vacuum-dried by heating to manufacture a carbon material. When the resultant carbon material was observed with a scanning electron microscope (SEM), the carbon material was a substantially spherical carbonaceous material aggregate in which scale-like carbonaceous material plates were three-dimensionally distributed like, e.g., a pinecone or a Chinese cabbage. Also, the carbonaceous material aggregate had a circular section with the structure as shown in FIG. 4 described previously. The average particle size of the carbonaceous material aggregate was measured by the above-mentioned laser diffraction type particle size analyzer and found to be 12 μm. The length and the thickness of the scale-like carbonaceous material plates were 0.1 to 12 μm and 10 to 100 nm, respectively. According to elemental analysis, the carbonaceous material plates contained 91 wt % of carbon atoms, and the molar ratio of hydrogen atoms to carbon atoms was 0.33. The average pore size of the carbonaceous material aggregate measured by the BET method was 59 Å.

EXAMPLE 9

A lithium secondary battery having the same structure as in Example 1 except that a carbon material explained below was used as a negative electrode was assembled.

Dilithium benzene-1,2-dicarboxylate was heated at 550° C. for 12 h in an argon gas ambient. Note that benzene-1,2-dicarboxylic acid as the material had an acid dissociation constant pKa of 3.5 to 4.5 and a molecular weight of 166. A qualitative analysis of the resultant product by powder X-ray diffraction confirmed that lithium carbonate existed as a by-product in the product. The product was crushed and washed with hydrochloric acid and water to remove this by-product, and the resultant material was vacuum-dried by heating to manufacture a carbon material. When the resultant carbon material was observed with a scanning electron microscope (SEM), the carbon material was a substantially spherical carbonaceous material aggregate in which scale-like carbonaceous material plates were three-dimensionally distributed like, e.g., a pinecone or a Chinese cabbage. Moreover, the carbonaceous material aggregate had a circular section with the structure as shown in FIG. 4 described previously. The average particle size of the carbonaceous material aggregate was measured by the above-mentioned laser diffraction type particle size analyzer and found to be 10 μm. The length and the thickness of the scale-like carbonaceous material plates were 0.1 to 10 μm and 10 to 100 nm, respectively. According to elemental analysis, the carbonaceous material plates contained 91 wt % of carbon atoms, and the molar ratio of hydrogen atoms to carbon atoms was 0.35. The average pore size of the carbonaceous material aggregate measured by the BET method was 60 Å.

EXAMPLE 10

A lithium secondary battery having the same structure as in Example 1 except that a carbon material explained below was used as a negative electrode was assembled.

Lithium benzoate was heated at 550° C. for 12 h in an argon gas ambient. Note that benzoic acid as the material had an acid dissociation constant pKa of 4.2 and a molecular weight of 122. A qualitative analysis of the resultant product by powder X-ray diffraction indicated that lithium carbonate existed as a by-product in the product. The product was crushed and washed with hydrochloric acid and water to remove this by-product, and the resultant material was vacuum-dried by heating to manufacture a carbon material. When the resultant carbon material was observed with a scanning electron microscope (SEM), the carbon material was a substantially spherical carbonaceous material aggregate in which scale-like carbonaceous material plates were three-dimensionally distributed like, e.g., a pinecone or a Chinese cabbage. Also, the carbonaceous material aggregate had a circular section with the structure as shown in FIG. 4 described previously. The average particle size of the carbonaceous material aggregate was measured by the above-mentioned laser diffraction type particle size analyzer and found to be 11 μm. The length and the thickness of the scale-like carbonaceous material plates were 0.1 to 11 μm and 10 to 100 nm, respectively. According to elemental analysis, the carbonaceous material plates contained 92 wt % of carbon atoms, and the molar ratio of hydrogen atoms to carbon atoms was 0.31. The average pore size of the carbonaceous material aggregate measured by the BET method was 58 Å.

EXAMPLE 11

A lithium secondary battery having the same structure as in Example 1 except that a carbon material explained below was used as a negative electrode was assembled.

Dilithium naphthalene-1,4-dicarboxylate was heated at 550° C. for 12 h in an argon gas ambient. Note that naphthalene-1,4-dicarboxylic acid as the material had an acid dissociation constant pKa of 3.5 to 4.5 and a molecular weight of 216. A qualitative analysis of the resultant product by powder X-ray diffraction showed that lithium carbonate existed as a by-product in the product. The product was crushed and washed with hydrochloric acid and water to remove this by-product, and the resultant material was vacuum-dried by heating to manufacture a carbon material. When the resultant carbon material was observed with a scanning electron microscope (SEM), the carbon material consisted of a substantially spherical carbonaceous material aggregate and a carbonaceous material aggregate obtained by dividing a sphere into eight equal parts. The spherical aggregate had a structure in which scale-like carbonaceous material plates were three-dimensionally distributed like, e.g., a pinecone or a Chinese cabbage. This spherical aggregate had a circular section with the structure as shown in FIG. 4 described previously. On the other hand, the aggregate having the divided shape had a structure in which scale-like carbonaceous material plates were three-dimensionally distributed. This aggregate had a sectoral section with the structure as shown in FIG. 7 described earlier. That is, in this sectoral section some of the scale-like carbonaceous material plates extend radially from the center of the arc. The surfaces in the direction of the thickness of the carbonaceous material plates are exposed on the section. Many gaps existed between the surfaces corresponding to the areas of the scale-like carbonaceous material plates. The average particle size of the carbonaceous material aggregate was measured by the above-mentioned laser diffraction type particle size analyzer and found to be 12 μm. The length and the thickness of the scale-like carbonaceous material plates were 0.1 to 12 μm and 10 to 100 nm, respectively. According to elemental analysis, the carbonaceous material plates contained 91 wt % of carbon atoms, and the molar ratio of hydrogen atoms to carbon atoms was 0.31. The average pore size of the carbonaceous material aggregate measured by the BET method was 56 Å.

EXAMPLE 12

A lithium secondary battery having the same structure as in Example 1 except that a carbon material explained below was used as a negative electrode was assembled.

Lithium naphthalene-1-carboxylate was heated at 550° C. for 12 h in an argon gas ambient. Note that naphthalene-1-carboxylic acid as the material had an acid dissociation constant pKa of 4.2 and a molecular weight of 172. A qualitative analysis of the resultant product by powder X-ray diffraction revealed that lithium carbonate existed as a by-product in the product. The product was crushed and washed with hydrochloric acid and water to remove this by-product, and the resultant material was vacuum-dried by heating to manufacture a carbon material. A microscopic observation of the resultant carbon material with a scanning electron microscope (SEM) showed that the carbon material was a substantially spherical carbonaceous material aggregate in which scale-like carbonaceous material plates were three-dimensionally distributed like, e.g., a pinecone or a Chinese cabbage. Also, the carbonaceous material aggregate had a circular section with the structure as shown in FIG. 4 described previously. The average particle size of the carbonaceous material aggregate was measured by the above-mentioned laser diffraction type particle size analyzer and found to be 12 μm. The length and the thickness of the scale-like carbonaceous material plates were 0.1 to 12 μm and 10 to 100 nm, respectively. According to elemental analysis, the carbonaceous material plates contained 90 wt % of carbon atoms, and the molar ratio of hydrogen atoms to carbon atoms was 0.31. The average pore size of the carbonaceous material aggregate measured by the BET method was 55 Å.

EXAMPLE 13

A lithium secondary battery having the same structure as in Example 1 except that a carbon material explained below was used as a negative electrode was assembled.

Dilithium naphthalene-1,8-dicarboxylic acid was heated at 550° C. for 12 h in an argon gas ambient. Note that naphthalene-1,8-dicarboxylic acid as the material had an acid dissociation constant pKa of 3.5 to 4.5 and a molecular weight of 216. A qualitative analysis of the resultant product by powder X-ray diffraction indicated that lithium carbonate existed as a by-product in the product. The product was crushed and washed with hydrochloric acid and water to remove this by-product, and the resultant material was vacuum-dried by heating to manufacture a carbon material. The resultant carbon material was observed at 1000× with a scanning electron microscope (SEM), and a photomicrograph was taken. This photomicrograph is shown in FIG. 12. As can be seen from FIG. 12, the carbon material was a substantially spherical carbonaceous material aggregate in which scale-like carbonaceous material plates were three-dimensionally distributed like, e.g., a Chinese cabbage. In addition, the carbonaceous material aggregate had a circular section with the structure as shown in FIG. 4 described previously. The average particle size of the carbonaceous material aggregate was measured by the above-mentioned laser diffraction type particle size analyzer and found to be 15 μm. The length and the thickness of the scale-like carbonaceous material plates were 0.1 to 15 μm and 10 to 100 nm, respectively. According to elemental analysis, the carbonaceous material plates contained 90 wt % of carbon atoms, and the molar ratio of hydrogen atoms to carbon atoms was 0.30. The average pore size of the carbonaceous material aggregate measured by the BET method was 55 Å.

EXAMPLE 14

A lithium secondary battery having the same structure as in Example 1 except that a carbon material explained below was used as a negative electrode was assembled.

Tetrasodium benzene-1,2,4,5-tetracarboxylate was heated at 550° C. for 12 h in an argon gas ambient. Note that benzene-1,2,4,5-tetracarboxylic acid as the material had an acid dissociation constant pKa of 3.5 to 4.5 and a molecular weight of 254. A qualitative analysis of the resultant product by powder X-ray diffraction showed that sodium carbonate existed as a by-product in the product. The product was crushed and washed with hydrochloric acid and water to remove this by-product, and the resultant material was vacuum-dried by heating to manufacture a carbon material.

When the resultant carbon material was observed with a scanning electron microscope (SEM), the carbon material was a substantially spherical carbonaceous material aggregate in which scale-like carbonaceous material plates were three-dimensionally distributed like, e.g., a pinecone or a Chinese cabbage. Also, the carbonaceous material aggregate had a circular section with the structure as shown in FIG. 4 described previously. The average particle size of the carbonaceous material aggregate was measured by the above-mentioned laser diffraction type particle size analyzer and found to be 12 $\mu$m. The length and the thickness of the scale-like carbonaceous material plates were 0.1 to 12 $\mu$m and 10 to 100 nm, respectively. According to elemental analysis, the carbonaceous material plates contained 90 wt % of carbon atoms, and the molar ratio of hydrogen atoms to carbon atoms was 0.30. The average pore size of the carbonaceous material aggregate measured by the BET method was 57 Å.

EXAMPLE 15

A lithium secondary battery having the same structure as in Example 1 except that a carbon material explained below was used as a negative electrode was assembled.

Tetrapotassium benzene-1,2,4,5-tetracarboxylate was heated at 550° C. for 12 h in an argon gas ambient. A qualitative analysis of the resultant product by powder X-ray diffraction indicated that potassium carbonate existed as a by-product in the product. The product was crushed and washed with hydrochloric acid and water to remove this by-product, and the resultant material was vacuum-dried by heating to manufacture a carbon material. When the resultant carbon material was observed with a scanning electron microscope (SEM), the carbon material was a substantially spherical carbonaceous material aggregate in which scale-like carbonaceous material plates were three-dimensionally distributed like, e.g., a pinecone or a Chinese cabbage. Again, the carbonaceous material aggregate had a circular section with the structure as shown in FIG. 4 described previously. The average particle size of the carbonaceous material aggregate was measured by the above-mentioned laser diffraction type particle size analyzer and found to be 10 $\mu$m. The length and the thickness of the scale-like carbonaceous material plates were 0.1 to 10 $\mu$m and 10 to 100 nm, respectively. According to elemental analysis, the carbonaceous material plates contained 90 wt % of carbon atoms, and the molar ratio of hydrogen atoms to carbon atoms was 0.30. The average pore size of the carbonaceous material aggregate measured by the BET method was 56 Å.

EXAMPLE 16

A lithium secondary battery having the same structure as in Example 1 except that a carbon material explained below was used as a negative electrode was assembled.

Tetracesium benzene-1,2,4,5-tetracarboxylate was heated at 550° C. for 12 h in an argon gas ambient. A qualitative analysis of the resultant product by powder x-ray diffraction showed that cesium carbonate existed as a by-product in the product. The product was crushed and washed with hydrochloric acid and water to remove this by-product, and the resultant material was vacuum-dried by heating to manufacture a carbon material. When the resultant carbon material was observed with a scanning electron microscope (SEM), the carbon material was a substantially spherical carbonaceous material aggregate in which scale-like carbonaceous material plates were three-dimensionally distributed like, e.g., a pinecone or a Chinese cabbage. Also, the carbonaceous material aggregate had a circular section with the structure as shown in FIG. 4 described previously. The average particle size of the carbonaceous material aggregate was measured by the above-mentioned laser diffraction type particle size analyzer and found to be 12 $\mu$m. The length and the thickness of the scale-like carbonaceous material plates were 0.1 to 12 $\mu$m and 10 to 100 nm, respectively. According to elemental analysis, the carbonaceous material plates contained 92 wt % of carbon atoms, and the molar ratio of hydrogen atoms to carbon atoms was 0.32. The average pore size of the carbonaceous material aggregate measured by the BET method was 55 Å.

EXAMPLE 17

A lithium secondary battery having the same structure as in Example 1 except that a negative electrode explained below was used was assembled.

80 wt % of a scale-like carbonaceous material aggregate obtained following the same procedures as in Example 1 and 20 wt % of natural graphite were mixed. 97 wt % of the resultant mixed carbon material, 2 wt % of styrenebutadiene rubber, and 1 wt % of carboxymethylcellulose were mixed in water to prepare a slurry. A copper foil (collector) was coated with the slurry, and the resultant material was pressed to manufacture a negative electrode.

EXAMPLE 18

A lithium secondary battery having the same structure as in Example 1 except that a carbon material explained below was used as a negative electrode was assembled.

Two types of carbon materials manufactured following the same procedures as in Example 13 were passed through a roll press at a pressure of 3 t and classified so that the average particle size was 12 $\mu$m. When the resultant carbon material was observed with a scanning electron microscope (SEM), the carbon material was a sectoral pillar-like carbonaceous material aggregate in which scale-like carbonaceous material plates were three-dimensionally distributed. Also, this carbonaceous material aggregate had a sectoral section with the structure as shown in FIG. 10 described previously. That is, in this section some of the scale-like carbonaceous material plates were parallel to each other to form layers. The surfaces in the direction of the thickness of the carbonaceous material plates are exposed on the section. The average particle size of the carbonaceous material aggregate was measured by the above-mentioned laser diffraction type particle size analyzer and found to be 12 $\mu$m. The length and the thickness of the scale-like carbonaceous material plates were 0.1 to 10 $\mu$m and 10 to 100 nm, respectively. According to elemental analysis, the carbonaceous material plates contained 90 wt % of carbon atoms, and the molar ratio of hydrogen atoms to carbon atoms was 0.34. The average pore size of the carbonaceous material aggregate measured by a BET method was 62 Å.

A comparative Example 1

A lithium secondary battery having the same structure as in Example 1 except that a carbon material explained below was used as a negative electrode was assembled.

Natural graphite was crushed into the form of scale-like plates and classified such that the scale-like graphite plates had a length of one side of 0.1 to 20 $\mu$m and a thickness of 10 to 100 nm. Polynaphthalene was prepared by using naphthalene and Lewis acid. 50 wt % of the natural graphite and 50 wt % of the polynaphthalene were heated at 3000° C.

for 1 h in an argon gas ambient, and the product was crushed to manufacture a carbon material. A microscopic observation of the resultant carbon material with an SEM revealed that the carbon material was a spherical carbonaceous material aggregate in which scale-like graphite plates were three-dimensionally distributed. The carbonaceous material aggregate had a circular section in which the scale-like graphite plates had random directions. The average particle size of the carbonaceous material aggregate was 12 μm. The length of one side and the thickness of the scale-like carbonaceous material plates were 1 to 12 μm and 10 to 100 nm, respectively. According to elemental analysis, the content of carbon atoms exceeded 99 wt %, and the molar ratio of hydrogen atoms to carbon atoms was less than 0.1 in the graphite plates. The average pore size of the carbonaceous material aggregate measured by the BET method was smaller than 20 Å.

Comparative Example 2

A lithium secondary battery having the same structure as in Example 1 except that a carbon material explained below was used as a negative electrode was assembled.

Polynaphthalene was prepared by using naphthalene and Lewis acid. This polynaphthalene were heated at 550° C. for 12 h in an argon gas ambient, and the product was crushed to manufacture a carbon material. The resultant carbon material was observed with an SEM and found to have no particular shape. According to elemental analysis, the carbon material contained 88 wt % of carbon atoms, and the molar ratio of hydrogen atoms to carbon atoms was 0.39. The average pore size of the carbon material measured by the BET method was smaller than 40 Å.

Comparative Example 3

A lithium secondary battery having the same structure as in Example 1 except that a carbon material explained below was used as a negative electrode was assembled.

Natural graphite was crushed and classified to adjust the average particle size to 12 μm, thereby manufacturing a carbon material. The resultant carbon material was found to be amorphous. According to elemental analysis, the content of carbon atoms exceeded 99 wt %, and the molar ratio of hydrogen atoms to carbon atoms was less than 0.1. The average pore size of the carbon material measured by the BET method was smaller than 20 Å.

The nonaqueous electrolyte secondary batteries of Examples 1 to 18 and Comparative Examples 1 to 3 were charged to 4.2V with a charging current of 1 A and further charged with a voltage of 4.2V for 2 h. Thereafter, these batteries were discharged to 2.7V with a discharging current of 1 A, and the discharge capacities were measured. TABLE 1 below shows the discharge capacity of each nonaqueous electrolyte secondary battery.

TABLE 1

|  | Carbon Content (wt %) | H/C | Average Pore Size (Å) | Discharge Capacity (mAh) |
| --- | --- | --- | --- | --- |
| Example 1 | 91 | 0.30 | 53 | 1500 |
| Example 2 | 95 | 0.25 | 60 | 1500 |
| Example 3 | 92 | 0.29 | 52 | 1500 |
| Example 4 | 93 | 0.28 | 55 | 1500 |
| Example 5 | 92 | 0.32 | 54 | 1500 |
| Example 6 | 92 | 0.32 | 57 | 1500 |

TABLE 1-continued

|  | Carbon Content (wt %) | H/C | Average Pore Size (Å) | Discharge Capacity (mAh) |
| --- | --- | --- | --- | --- |
| Example 7 | 92 | 0.32 | 62 | 1500 |
| Example 8 | 91 | 0.33 | 59 | 1500 |
| Example 9 | 91 | 0.35 | 60 | 1500 |
| Example 10 | 92 | 0.31 | 58 | 1500 |
| Example 11 | 91 | 0.31 | 56 | 1500 |
| Example 12 | 90 | 0.31 | 55 | 1500 |
| Example 13 | 90 | 0.30 | 55 | 1500 |
| Example 14 | 90 | 0.30 | 57 | 1500 |
| Example 15 | 90 | 0.30 | 56 | 1500 |
| Example 16 | 92 | 0.32 | 55 | 1500 |
| Example 17 | 91 | 0.30 | 53 | 1450 |
| Example 18 | 90 | 0.34 | 62 | 1450 |
| Comparative Example 1 | >99 | <0.1 | <20 | 1250 |
| Comparative Example 2 | 88 | 0.39 | 40 | 1200 |
| Comparative Example 3 | >99 | <0.1 | <20 | 1350 |

As is apparent from TABLE 1, the discharge capacity was increased in any of the secondary batteries of Examples 1 to 18 each including a carbonaceous material aggregate in which carbonaceous material plates were three-dimensionally distributed, and which had any of (a) a circular section in which some of the carbonaceous material plates extend radially, (b) a sectoral section in which some of the carbonaceous material plates radially extend from the center of the arc, and (c) a section in which some of the carbonaceous material plates are parallel to each other, and the carbonaceous material plates having a molar ratio of hydrogen atoms to carbon atoms of 0.2 to 0.4.

In contrast, the discharge capacities of the secondary batteries in Comparative Examples 1 to 3 were lower than those of the secondary batteries in Examples 1 to 18. This is so because the secondary battery of Comparative Example 1 included a negative electrode containing a spherical carbonaceous material aggregate in which scale-like graphite plates were three-dimensionally distributed such that these scale-like graphite plates had random directions in a section, the secondary battery of Comparative Example 2 included a negative electrode containing a carbonaceous material having no particular shape, although the molar ratio of hydrogen atoms to carbon atoms fell within the range defined earlier, and the secondary battery of Comparative Example 3 included a negative electrode containing amorphous graphite.

As has been described in detail above, the present invention can provide a nonaqueous electrolyte secondary battery having an increased capacity per unit volume. The present invention can also provide a nonaqueous electrolyte secondary battery negative electrode manufacturing method capable of realizing a nonaqueous electrolyte secondary battery having an increased capacity per unit volume.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalent.

What is claimed is:

1. A nonaqueous electrolyte secondary battery comprising: a nonaqueous electrolyte;

a negative electrode containing a carbonaceous material aggregate consisting essentially of carbonaceous material plates, said carbonaceous material aggregate having a structure in which carbonaceous material plates are integrated into one body with a space between them, and having a sectoral section in which almost all the carbonaceous material plates are radially arranged from a center of an arc, said carbonaceous material plates being capable of absorbing and desorbing lithium ions and having a molar ratio of hydrogen to carbon of 0.2 to 0.4.

2. A secondary battery according to claim 4, wherein surfaces in a direction of thickness of said carbonaceous material plates are exposed on said sectoral section.

3. A secondary battery according to claim 1, wherein surfaces in a direction of thickness of said carbonaceous material plates are exposed on said section.

4. A secondary battery according to claim 1, wherein a carbon content of said carbonaceous material plates is not less than 88 wt %.

5. A secondary battery according to claim 1, wherein an average pore size of said carbonaceous material aggregate is 40 to 85 Å.

6. A secondary battery according to claim 1, wherein a length of said carbonaceous material plates is 0.1 to 20 µm.

7. A secondary battery according to claim 1, wherein a thickness of said carbonaceous material plates is 0.01 to 2 µm.

8. A secondary battery according to claim 1, wherein a shape of the carbonaceous material aggregate is a sphere, a hemisphere, a body of revolution obtained by revolving an ellipse about its major axis, a shape obtained by dividing the sphere or the body of revolution into an arbitrary number, a sectoral pillar or a column.

9. A secondary battery according to claim 1, wherein the negative electrode further contains another carbonaceous material capable of absorbing and desorbing.

10. A secondary battery according to claim 1, wherein the nonaqueous electrolyte contains at least one nonaqueous solvent selected from the group consisting of ethylenecarbonate, propylenecarbonate, diethylcarbonate, dimethylcarbonate, methylethylcarbonate, 1,2-dimethoxyethane, 2-methyltetrahydrofuran, γ-butyrolactone, γ-valerolactone, δ-valerolactone, methyl acetate, ethyl acetate, propyl acetate, isopropyl acetate, methyl propionate, ethyl propionate and propyl propionate, and a lithium salt to be dissolved into the at least one nonaqueous solvent.

11. The nonaqueous electrolyte secondary battery according to claim 1, wherein pore sizes of the carbonaceous material aggregate fall within 55–65 Å as measured by a BET method.

12. A nonaqueous electrolyte secondary battery comprising:
  a nonaqueous electrolyte;
  a negative electrode containing a carbonaceous material aggregate consisting essentially of carbonaceous material plates, said carbonaceous material aggregate having a structure in which carbonaceous material plates are integrated into one body with a space between them, and having a circular or elliptical section in which almost all the carbonaceous material plates are radially arranged toward the outer periphery of the circle or ellipse, said carbonaceous material plates being capable of absorbing and desorbing lithium ions and having a molar ratio of hydrogen to carbon of 0.2 to 0.4.

13. A secondary battery according to claim 1, wherein surfaces in a direction of thickness of carbonaceous material plates are exposed on said section.

14. A secondary battery according to claim 12, wherein a carbon content of said carbonaceous material plates is not less than 88 wt %.

15. A secondary battery according to claim 12, wherein a length of said carbonaceous material plates is 0.1 to 20 µm.

16. A secondary battery according to claim 12, wherein a thickness of said carbonaceous material plates is 0.01 to 2 µm.

17. A secondary battery according to claim 12, wherein a shape of the carbonaceous material aggregate is a sphere, a hemisphere, a body of revolution obtained by revolving an ellipse about its major axis, a shape obtained by dividing the sphere or the body of revolution into an arbitrary number, a sectoral pillar or a column.

18. A secondary battery according to claim 12, wherein the negative electrode further contains another carbonaceous material capable of absorbing and desorbing lithium ions.

19. A secondary battery according to claim 12, wherein the nonaqueous electrolyte contains at least one nonaqueous solvent selected from the group consisting of ethylenecarbonate, propylenecarbonate, diethylcarbonate, dimethylcarbonate, methylethylcarbonate, 1,2-dimethoxyethane, 2-methyltetrahydrofuran, γ-butyrolactone, γ-valerolactone, δ-valerolactone, methyl acetate, ethyl acetate, propyl acetate, isopropyl acetate, methyl propionate, ethyl propionate and propyl propionate, and a lithium salt to be dissolved into the at least one nonaqueous solvent.

20. The nonaqueous electrolyte secondary battery according to claim 12, wherein lengths of the carbonaceous material plates fall within 0.5 to 10 µm.

21. The nonaqueous electrolyte secondary battery according to claim 12, wherein pore sizes of the carbonaceous material aggregate fall within 55–65 Å as measured by a Bet method.

22. A method of manufacturing a negative electrode containing a carbonaceous material which is capable of absorbing and desorbing lithium ions, wherein said carbonaceous material is formed by a method comprising the steps of:
  heat-treating a carbonaceous material precursor containing at least one aromatic metal compound substrate selected from the group consisting of an alkaline metal salt of an aromatic compound, an alkaline earth metal salt of an aromatic compound, an alkaline metal complex of an aromatic compound and an alkaline earth metal complex of an aromatic compound, in an inert gas ambient at 500–1500° C., thereby carbonizing or graphitizing the carbonaceous material precursor; and
  washing the carbonized or graphitized carbonaceous material precursor, thereby removing a side product, metal salt.

23. A method according to claim 22, wherein an aromatic compound for forming said metal salt or said metal complex has an acid dissociation constant pKa of not more than 11.

24. A method according to claim 23, wherein a molecular weight of said aromatic compound is 94 to 600.

25. A method according to claim 23, wherein said aromatic compound has a functional group containing at least one element selected from the group consisting of oxygen, nitrogen, and sulfur.

26. A method according to claim 25, wherein said functional group is a carboxyl group.

27. A method according to claim 22, wherein said aromatic compound is one selected from the group consisting of benzoic acid, benzene-1,2-dicarboxylic acid, benzene-1,3-dicarboxylic acid, benzene-1,4-dicarboxylic acid, benzene-1,2,4-tricarboxylic acid, benzene-1,2,4,5-tetracarboxylic acid, naphthalene-1-carboxylic acid, naphthalene-1,4-dicarboxylic acid, naphthalene-1,8-dicarboxylic acid, perylene-3,4,9,10-tetracarboxylic acid, phenol, hydroquinone, biphenol, bisphenol A, hydronaphthoquinone and hydroanthroquinone.

* * * * *